US012787117B2

(12) United States Patent
Wang et al.

(10) Patent No.: US 12,787,117 B2
(45) Date of Patent: Nov. 3, 2026

(54) SYSTEMS, APPARATUS AND METHODS FOR ENHANCING BROADCAST SERVICES IN WIRELESS LOCAL AREA NETWORKS

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 310 days.

(21) Appl. No.: 18/683,977

(22) PCT Filed: Aug. 18, 2022

(86) PCT No.: PCT/US2022/040757

§ 371 (c)(1),
(2) Date: Feb. 15, 2024

(87) PCT Pub. No.: WO2023/023250

PCT Pub. Date: Feb. 23, 2023

(65) Prior Publication Data

US 2024/0349398 A1 Oct. 17, 2024

Related U.S. Application Data

(60) Provisional application No. 63/331,028, filed on Apr. 14, 2022, provisional application No. 63/234,615, filed on Aug. 18, 2021.

(51) Int. Cl.

| | |
|---|---|
| ***H04W 76/40*** | (2018.01) |
| ***H04W 48/10*** | (2009.01) |
| *H04W 84/12* | (2009.01) |

(52) U.S. Cl.

CPC .......... *H04W 76/40* (2018.02); *H04W 48/10* (2013.01); *H04W 84/12* (2013.01)

(58) Field of Classification Search

CPC ..... H04W 76/40; H04W 48/10; H04W 48/12; H04W 84/12; H04W 4/06

See application file for complete search history.

(56) References Cited

U.S. PATENT DOCUMENTS

| | | | | |
|---|---|---|---|---|
| 2013/0177002 A1 | 7/2013 | Sun et al. | | |
| 2013/0283346 A1* | 10/2013 | Sun | ........................... | H04L 9/00 726/3 |
| 2022/0132421 A1* | 4/2022 | Wang | .................... | H04W 48/08 |

FOREIGN PATENT DOCUMENTS

| | | | |
|---|---|---|---|
| CN | 115209353 A | * 10/2022 | ........ H04W 36/0007 |

OTHER PUBLICATIONS

Xiaofei, Power Efficient Broadcasting, Mar. 2020, IEEE, pp. 1-12 (Year: 2020).*

(Continued)

*Primary Examiner* — Farid Seyedvosoghi

(74) *Attorney, Agent, or Firm* — VOLPE KOENIG

(57) ABSTRACT

Disclosed herein are apparatus and methods for enhancing broadcast services in wireless local area networks (WLAN). Embodiments provide systems, apparatus and methods that ensure a mobile transceiver (STA) receiving a broadcast stream, receives the stream in a continuous and seamless manner as the STA moves from an area covered by a first AP into an area covered by a second AP. Further embodiments provide systems, apparatus and methods by which an Access Point acquires channel sounding information from one or more sensor devices comprising transceiver stations (STA) to provide enhanced broadcast channel condition services to STA operating within the AP coverage area.

18 Claims, 11 Drawing Sheets

(56) References Cited

OTHER PUBLICATIONS

Hitoshi, Resolutions for Clause 11.100.2, May 2021, IEEE, pp. 1-14 (Year: 2021).*
Chitrakar et al., "Legacy Support in 11bf," IEEE 802.11-21-1047r1 (Jul. 1, 2021).
De La Oliva et al., "802.11bc LB257—Resolution for 2074, part 1," IEEE 802.11-22/0341r1 (Mar. 2022).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhanced Broadcast Service, IEEE 802.11bc/D1.04 (May 2021).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhanced Broadcast Service, IEEE 802.11bc/D4.0 (Aug. 2022).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE 802.11ax-2021 (Feb. 2021).
Morioka, "Resolutions for Clause 11.100.2," IEEE 802.11-21/0239r2 (May 2021).
Wang et al., "Power Efficient Broadcasting," IEEE 802.11-20/551r5 (Mar. 2020).
Morioka, "Proposed Resolution Text for CID 3071," IEEE 802.11-22/0954r0 (Jul. 2022).
Wang et al., "Proposed Text for CR Part 3," IEEE 802.11-22-0869r0 (Jun. 2022).

* cited by examiner

SYSTEMS, APPARATUS AND METHODS FOR ENHANCING BROADCAST SERVICES IN WIRELESS LOCAL AREA NETWORKS

CROSS-REFERENCE TO RELATED APPLICATIONS

This application is the U.S. National Stage, under 35 U.S.C. § 371, of International Application No. PCT/US2022/040757 filed Aug. 18, 2022, which claims the benefit of U.S. Provisional Application No. 63/234,615, filed Aug. 18, 2021, and U.S. Provisional Application No. 63/331,028, filed Apr. 14, 2022, the contents of which are incorporated herein by reference.

BACKGROUND

Wireless networks include mobile, portable and fixed stations (STA) with increasingly diverse capabilities and usage profiles. For example, in an Internet of Things (IoT) environment, wireless Internet access point (AP) may serve a large number of small limited capability sensor STAs. Such sensor devices typically relay relatively small amounts of various sensed environmental parameters to remote receivers via wireless uplinks to an AP. At the same time an AP may also serve Internet access to STAs comprising wireless laptops, PDAs, mobile phones, etc. These devices can be equipped with multiple transceivers configured for wireless communication in one or more radio frequency bands corresponding to one or more IEEE 802.11 standards: 900 MHz (802.11ah), 2.4 GHz (802.11b/g/n/ax), 3.6 GHz (802.11y), 4.9 GHz-5 GHz (802.11j-WLAN), 5 GHz (802.11a/h/j/n/ac/ax), 5.9 GHz (802.11p), 6 GHz (802.11ax) and 60 GHz (802.11ad/ay.

An AP typically provides a wide range of services to wireless STAs operating within the AP broadcast range. For example, an AP can broadcast streams of media content to laptop, PDA and smartphone STA within its broadcast range. The AP can also broadcast channel conditions to STAs trying to connect to the AP as well as to STAs already associated with an AP. Therefore, it is important for an AP to be capable of ascertaining channel conditions for its broadcasts. It is also important for an AP to be capable of supporting a STA receiving a broadcast stream as the STA transitions from the area covered by the AP to an area covered by a different AP. Accordingly a need exists for an AP to provide enhanced broadcast services to STAs operating in wireless local area networks (WLANs).

SUMMARY

Disclosed herein are apparatus and methods for enhancing broadcast services in wireless local area networks (WLAN). Embodiments provide systems, apparatus and methods that ensure a mobile transceiver (STA) receiving a broadcast stream, receives the stream in a continuous and seamless manner as the STA moves from an area covered by a first AP into an area covered by a second AP. Further embodiments provide systems, apparatus and methods by which an Access Point device acquires channel sounding information from one or more sensor devices comprising transceiver stations (STA) to provide enhanced broadcast channel condition services to STA operating within the AP coverage area.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
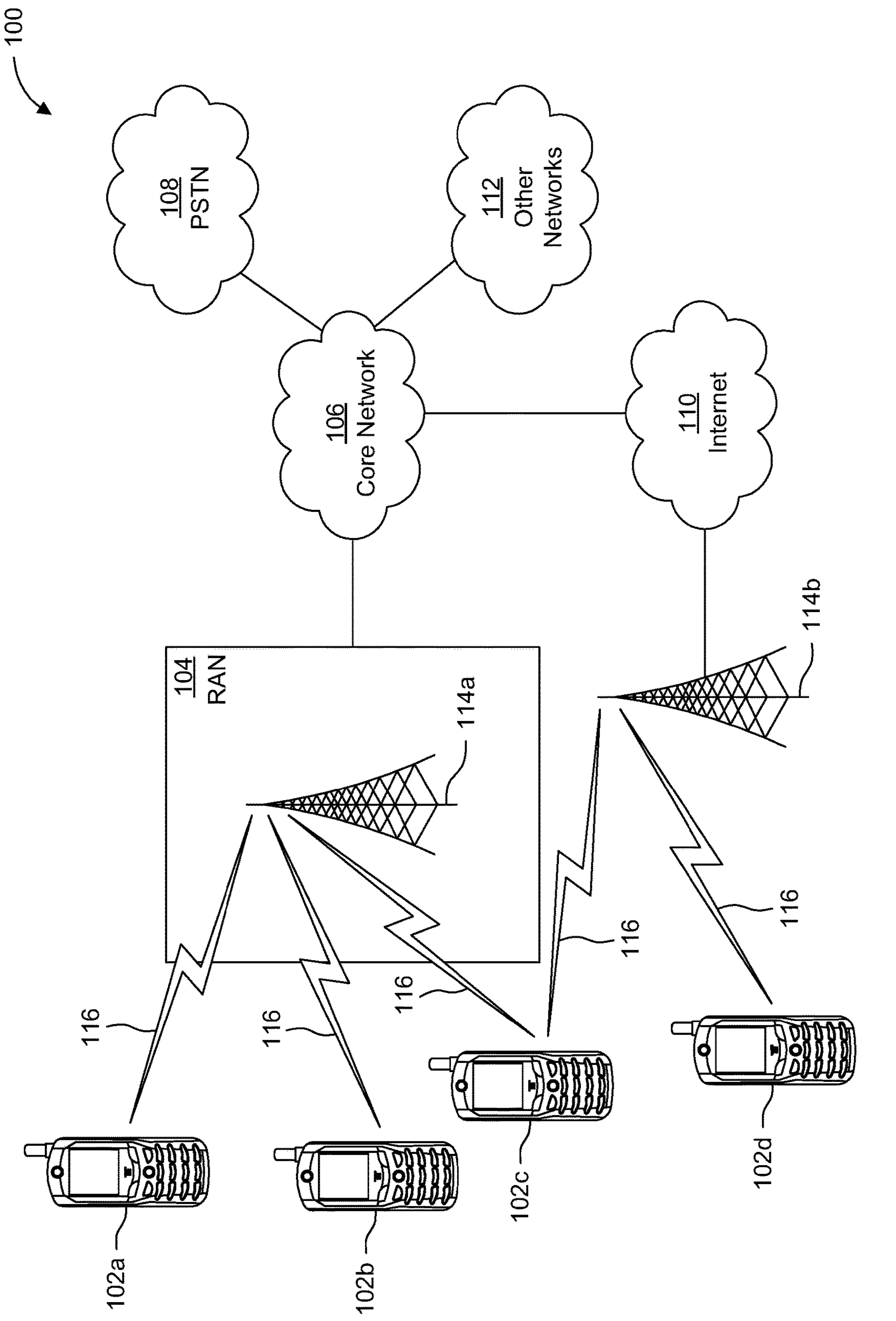
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
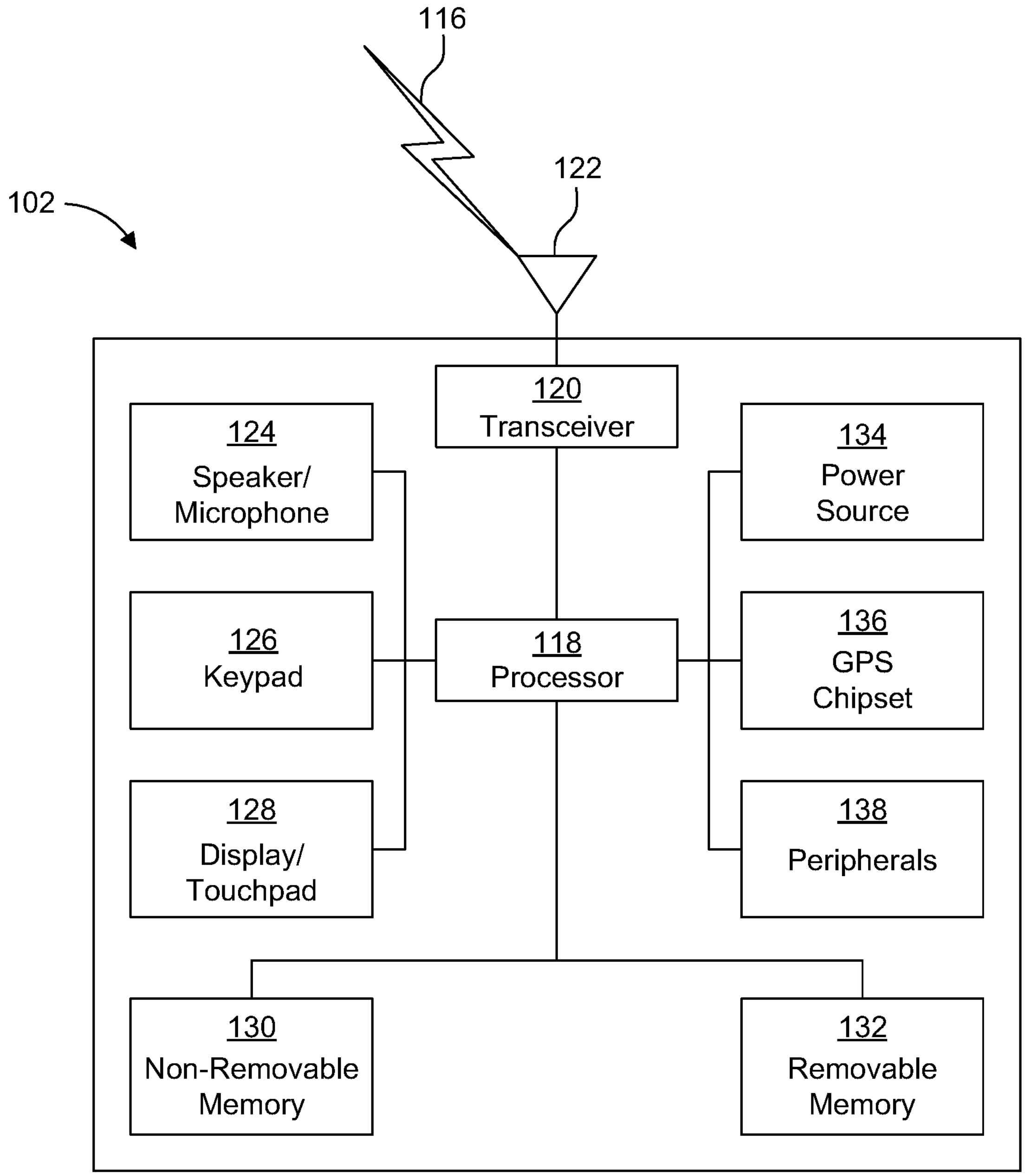
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
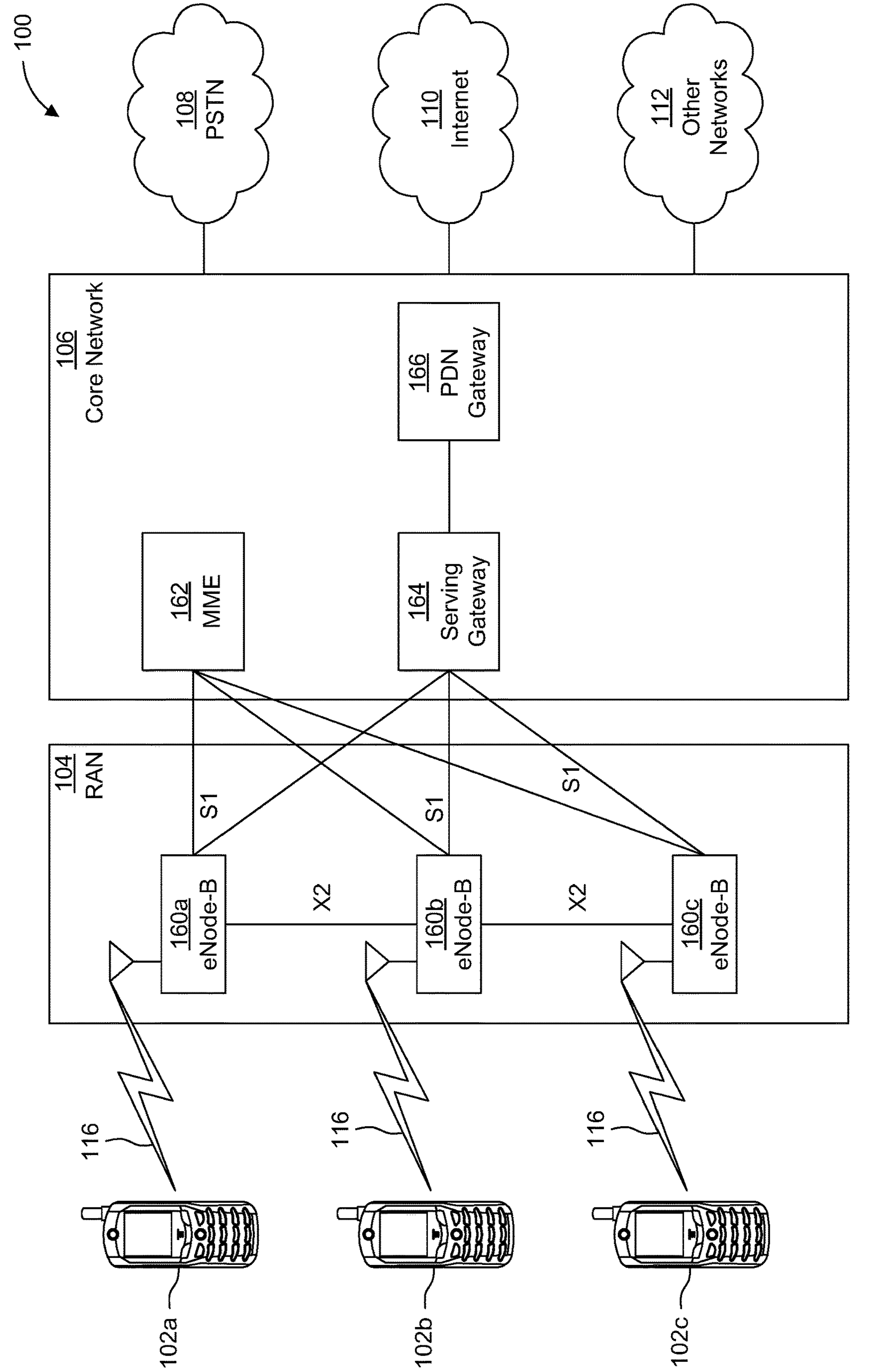
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
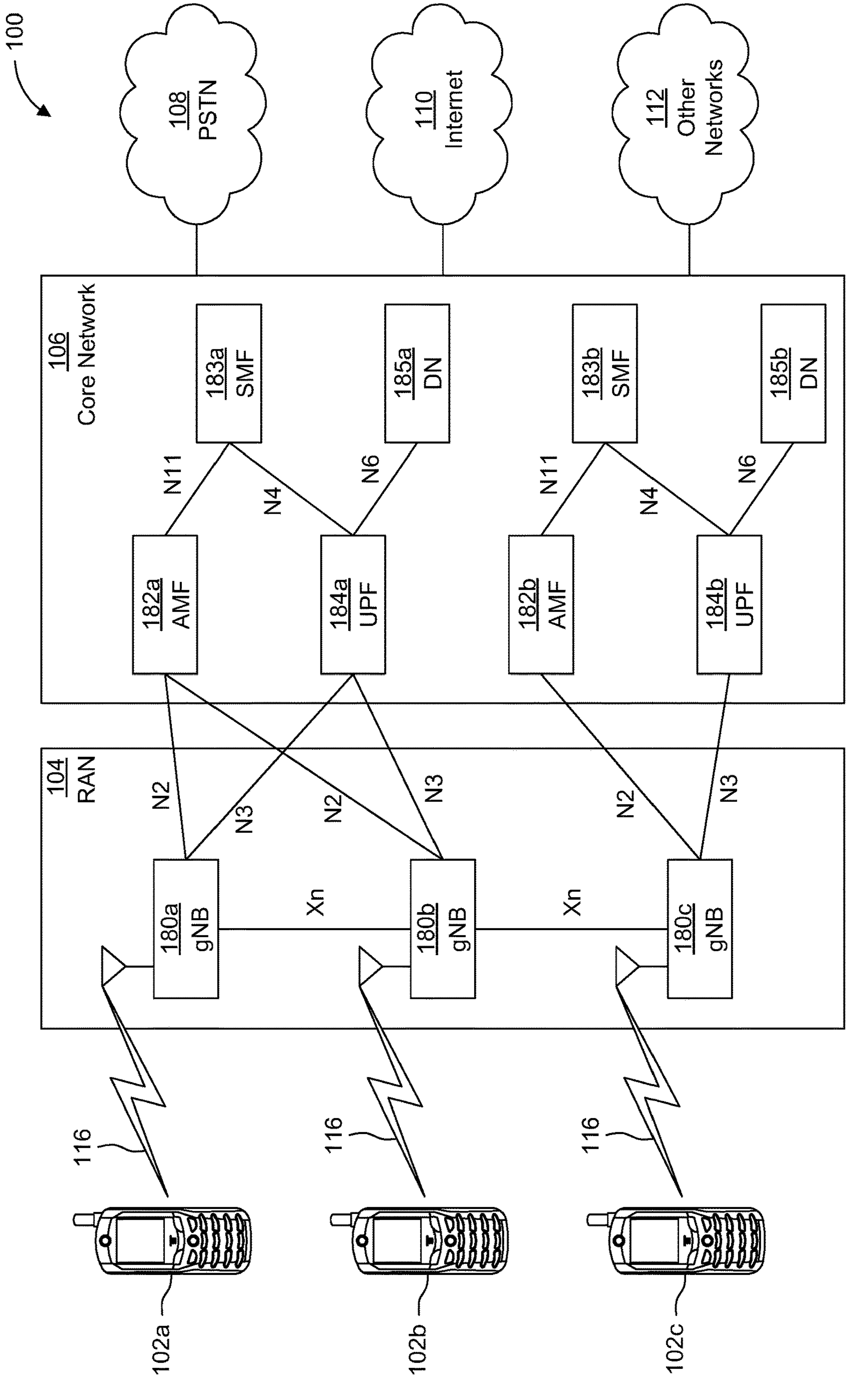
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

An Enhanced broadcast service (eBCS or EBCS) as used herein is any broadcast service that enhances transmission and reception of broadcast data in an infrastructure BSS where there is an association between an AP (broadcast transmitter) and one or more STA clients (broadcast receivers), and also in situations in which there is not an association between an AP server and AP clients.

Channel sensing as used herein is a mechanism to detect channel occupancy or predict future traffic in wireless networks that use carrier sense multiple access with collision avoidance (CSMA/CA). For example, in a virtual channel sensing technique, a timer mechanism is used that is based upon durations of previous frame transmission in order to predict future traffic in the channel. A network allocation vector (NAV) is used as a counter that counts down to zero. The maximum NAV duration is the transmission time required by a frame, which is the time for which the channel will be busy. At the start of transmission of a frame, the NAV value is set to its maximum. A non-zero value indicates that the channel is busy, and thus the STA does not contend for the wireless medium. When the NAV value decrements to zero, that indicates that the channel may be free and the STA can then contend for the wireless medium.

Sensing procedure as used herein is a series of steps or acts by which a wireless device performs channel sensing for the purpose of measuring some parameter of a channel.

Sensing session as used herein is a temporary and cooperative exchange of signals or information between two or more devices to perform channel sensing. A sensing session may be further defined by operational parameters associated with that sensing session. A sensing session can comprise any one or more of the following processes: setup, measurement, reporting, and/or termination. Accordingly, a STA implementing sensing according to the disclosed embodiments is configured to perform one or more of the following sensing functions: setup, measurement, reporting and or termination.

A sensing initiator is a STA that initiates a sensing session.

A sensing responder is a STA that participates in a sensing session initiated by a sensing initiator.

A sensing transmitter is a STA that transmits protocol packet data units (PPDUs) corresponding to a sensing measurement or a sensing session.

A sensing receiver is a STA that receives PPDUs sent by a sensing transmitter and performs sensing measurement acts as part of a sensing session.

In the above definitions a STA can assume more than one role in a sensing session. For example, in a given session a first STA can serve as a sensing transmitter as a well as a sensing receiver. In another session a first STA can serve as a sensing transmitter and a second STA can serve as a sensing transmitter. Not all STAs in a BSS necessarily participate in every sensing sessions. In some instances, no STA will serve as a sensing transmitter or a sensing receiver.

In some embodiments, EBCS APs broadcast data streams on a downlink to non-AP STAs. In some embodiments, an AP provides broadcast services (i.e. data streams) to associated STA as well as unassociated STA. In some embodiments, an AP provides broadcast services to up to 300 non-AP STA. A non-AP STA can be a low cost non AP STA that is only capable of receiving the AP broadcast data stream but is not capable of transmitting directly to the AP.

The embodiments described herein may be found in a variety of applications. For example, an AP broadcasts video streams to STAs in a sports stadium. In another example application, an AP broadcasts streams of safety information to vehicles. In some embodiments, an AP broadcasts data provided by sensors on an uplink to the AP. Other applications include broadcasts of museum information, multilingual broadcasts and Event Producer Information and Content Broadcasting.

An AP may automatically provide EBCS data streams, or provide particular EBCS traffic streams on a routine or scheduled basis depending on a broadcast schedule or configuration. For some data streams, a STA in an AP coverage area need not be associated with the AP to receive the broadcast data stream from the AP. For some data streams, a STA need not be registered with or request the AP to receive the broadcast data stream. Thus, an AP may not have records of all STAs receiving its broadcast data streams in a scenario where the AP is also broadcasting data streams to unassociated STAs and/or unregistered STAs. In those instances, a STA need not request an EBCS data stream to receive it. In other instances, an AP provides one or more EBCS traffic streams only upon request or register of one or more STAs.

In some cases, one or more EBCS data streams are always provided, depending on the operators' configuration, while other EBCS data streams are provided upon request from a STA. For an EBCS data stream that is transmitted by the AP upon request or register from a STA, mobility support may be needed for a STA that is currently receiving an EBCS data stream and is predicted to move outside a broadcast coverage range of the current AP. This scenario raises an issue as to how to provide an efficient mechanism to ensure that an EBCS traffic stream can be continued seamlessly upon leaving a coverage area of a first AP and entering the coverage area of a second AP.

An EBCS AP may provide broadcast data streams to STAs that are either associated with the EBCS AP or unassociated with the EBCS AP. Information for EBCS broadcast services provided by an AP may be contained in an EBCS information (Info) frame, which may be broadcasted by the AP. Discovery methods disclosed herein may be used by STAs to discover EBCS services provided by the AP by efficiently discovering the timing of the EBCS Info frame.

In some embodiments, WLAN sensing protocols (e.g., 802.11bf) may support sensing operations by a large number (e.g., thousands) of non-AP STAs, including legacy STAs (e.g. pre 802.11bf devices), that have certain sensing capabilities. The sensing operations may include various sensing phases including setup phase, measurement phase, reporting phase, and/or termination phase.

In one embodiment, a seamless transition of reception of an EBCS traffic stream by a STA from a first AP to a second AP occurs. The STA receives an EBCS traffic stream from a first AP. The STA is mobile and is leaving the area covered by the first AP and entering an area covered by one or more second APs. The first AP, which is an EBCS AP, may provide information about other EBCS APs that provide the same EBCS data streams that one or more of the EBCS STAs are currently consuming, or information about one or more EBCS data streams that the EBCS AP is currently providing. The first AP may transmit at least one of a beacon, a short beacon, a probe response, a fast initial link setup (FILS) Discovery frame and/or or other management, control, or data frame that includes indications of one or more second APs providing the same or similar EBCS data streams as those provided by the first AP.

In one embodiment, the first AP provides the indications of the one or more second EBCS APs that provide similar or the same EBCS data streams in a Neighbor Report element or a Reduced Neighbor Report element, or a newly designed element. For example, the STA may send a request for a Neighbor Report to the first AP. The first AP sends a Neighbor Report or Reduced Neighbor Report containing information about neighboring APs that are known candidates for the first STA or other STAs to receive the same EBCS data streams as offered by the first AP. The information may include whether the first STA is required to associate with one or more second APs to receive the same EBCS data streams from one or more of the second APs.

In one embodiment, the first AP provides an indication of one or more second EBCS APs that provide the same or similar EBCS data streams by constructing an EBCS Neighbor AP sub-element, which may be included in a Neighbor Report element, Reduced Neighbor Report element, or in a newly designed EBCS Neighbor element, or in any other newly designed element. The EBCS Neighbor AP sub-element may then be transmitted, for example, to a STA.

Figure 2A:
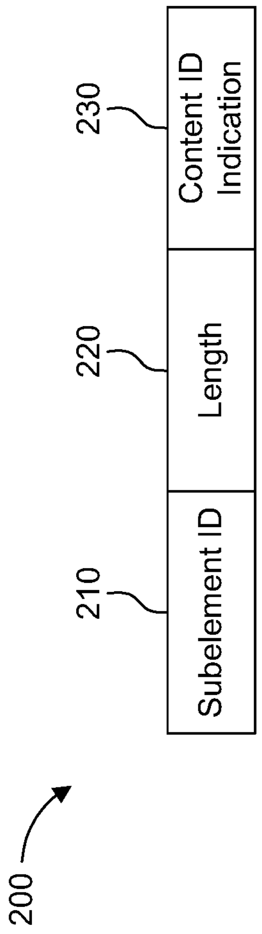
FIG. 2A illustrates an example enhanced broadcast service (EBCS) Neighbor AP sub-element.

Referring to FIG. 2A, an EBCS Neighbor AP sub-element 200 includes one or more of the following fields or subfields, a Subelement ID field 210, a Length field 220, and a Content ID Indication field 230. The Subelement ID field 210 may be used to indicate that the sub-element is an EBCS Neighbor AP sub-element. The Subelement ID field may contain some number of bits that encode a value indicative to a decoder that the subelement is an EBCS Neighbor AP subelement. The Length field 220 is used to indicate the length of the sub-element. The length field may contain some number of bits that encode a value indicative to a decoder of the length of the subelement. The Content ID Indication field 230 may be used to indicate one or more content identifiers that are associated with one or more EBCS data streams or content that is provided by the AP. This field may be a bitmap to indicate one or more content IDs for EBCS data streams that the AP is currently broadcasting. The field may provide an explicit indication of each content ID associated with the EBCS traffic streams that the current AP is currently providing.

The EBCS Neighbor AP sub-element may be contained in one or more elements, for example, the Neighbor Report element, or Reduced Neighbor Report element, which may be used to indicate one or more neighboring APs such that the indication of the ID of the APs may be omitted in the EBCS Neighbor AP sub-element.

In another embodiment, the first AP generates neighbor AP information. The first AP may generate a target beacon transmission time (TBTT) information subfield, or a BSS Parameters subfield, to be included in a Neighbor Report element, or in a Reduced Neighbor Report Element, or a newly designed element. In any case, the first AP inserts one or more indicator bits, and sets the bits to "true" or "false" (which may correspond respectively to a value of 1 or 0, or vice versa) to indicate that the AP associated with the neighbor AP information field can support one or more of the data streams or content that is supported by the first AP.

In another embodiment, the indicator bit or bits may be set to "true", or "1", to indicate that the AP associated with the neighbor AP information supports one or more, or all, active EBCS data streams or content that is currently provided by the transmitting AP. In another embodiment, the indicator bit or bits may be set to "true" or "1" to indicate that the AP associated with the neighbor AP information supports one or more, or all, EBCS data streams or content, or all EBCS data streams or content that require registration or request, that are currently provided by the transmitting AP. Such indication may be contained in the Reduced Neighbor Report element, or any other element. In one example, the indication is not set for any co-located or co-hosted AP or any non-transmitted basic service set identifier (BSSID) as the transmitting AP.

Figure 2B:
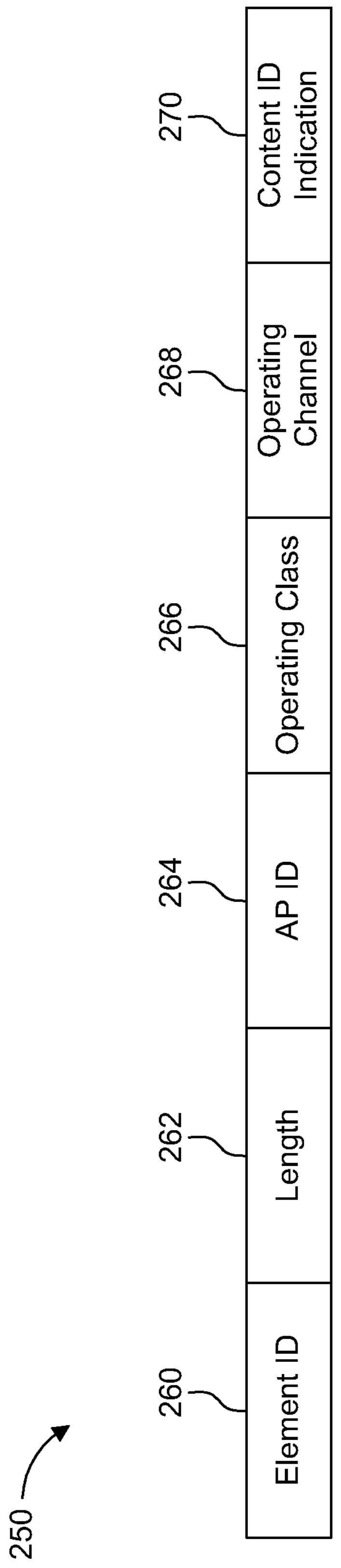
FIG. 2B illustrates an example EBCS Neighbor AP subfield.

FIG. 2B illustrates an EBCS Neighbor AP element 250. The EBCS Neighbor AP element may include one or more of the following fields. Although shown in FIG. 2B as including all fields, this is only for illustration, and any combination of the fields shown may be present in the EBCS Neighbor AP element 250. The element ID 260 is used to indicate that the element is an EBCS Neighbor AP element. The element ID 260 may contain some number of bits that indicate to a decoder that the element is an EBCS Neighbor AP element 250. The Length 262 is used to indicate the length of the element. The Length 262 may contain some number of bits that encode a value indicative to a decoder of the length of the EBCS Neighbor AP element 250. The AP ID 264 indicates the AP ID, such as a MAC address of the AP, or a BSSID, or the MAC address of the AP MLD. The AP ID 264 may contain some number of bits that encode a value indicative to a decoder of the identifiers mentioned. The Operating Class 266 and the Operating Channel 268 indicate the operating class and operating channels of the AP, respectively. The Operating Class 266 and the Operating Channel 268 fields may contain some number of bits that encode a value indicative to a decoder of the operating class and the operating channel of the AP, respectively. The Content ID Indication 270 indicates one or more Content IDs that are associated with one or more EBCS data streams transmitted by the AP. This field may also be implemented as a bitmap to indicate one or more content IDs for EBCS data streams that the current transmitting AP provides. Alternatively, the field includes an explicit indication of each content ID. Alternatively, the field is a bitmap indicating which EBCS traffic streams provided by the current AP are supported.

Note that any of the information described above may be present in a sub-element or an element. Any one or more subfield or information provided thereby can be included in any existing or new element, sub-element, control, management, data frame, and/or PHY and MAC header, or any combination thereof.

In some embodiments, a STA may receive a Reduced Neighbor Report and determine to receive EBCS streams from another AP discovered through the Reduced Neighbor Report received in an associated AP's beacon frame.

As mentioned above, when a STA is consuming an EBCS traffic stream from a first AP, the STA may desire to continue consuming the EBCS traffic stream if the STA roams to another AP. An EBCS AP/BSS transition procedure is needed. In one embodiment, an EBCS AP/BSS transition procedure may begin with an EBCS AP broadcasting one or more EBCS data streams. The AP indicates the available EBCS data streams in one or more frames, such as beacon, short beacon, EBCS Info frame, and/or FILS Discovery frames. For example, the AP may transmit a periodic EBCS Info frame, and contained in that frame is information regarding which EBCS traffic streams the AP is providing or transmitting. The EBCS AP may include information about one or more EBCS neighbor APs in one or more elements or frames, including but not limited to, a Neighbor Report element or a Reduced Neighbor Report element, or may transmit a new EBCS Neighbor AP element, frame, or other data structure. For example, an EBCS Neighbor AP element may be included in the Neighbor Report element to indicate an AP's capability to provide all traffic streams, or all active EBCS traffic streams, or any other content that is provided by the current transmitting AP, or to indicate that the AP has capability to provide all, or all active, EBCS traffic streams and/or content that may or may not require a STA to register or request the second AP that are currently provided by the first AP.

An EBCS non-AP STA may consume an EBCS data stream or content that requires the EBCS non-AP STA to register with the AP or to transmit a request via EBCS Content request frames. The EBCS non-AP STA may receive a frame from an EBCS AP that is the transmitter of, or capable of providing, the EBCS traffic stream or content that contains one or more indicators of one or more EBCS Neighbor APs. Such information may be included in a Neighbor Report element, a Reduced Neighbor Report element, or an EBCS Neighbor AP element. The EBCS non-AP STA may use information received regarding EBCS Neighbor APs to register for one or more EBCS data streams or content offered by one or more indicated EBCS neighbor APs. The EBCS non-AP STA may use an EBCS Traffic Stream or Content Request ANQP-element to register for one or more EBCS data streams or content offered by a neighbor AP. Alternatively, an EBCS non-AP STA may use information received from EBCS Neighbor APs to request one or more EBCS data streams or content from one or more indicated EBCS Neighbor APs, for example using an EBCS Traffic Stream or content request frame.

When a registration request made using an EBCS Traffic Stream or a Content Request ANQP-element, or made using an EBCS request including an EBCS Traffic Stream/content Request frame, is unsuccessful, the EBCS AP may respond with an ANQP-element or EBCS Traffic Stream/Content Response frame in which an EBCS Request status bit is set to a value that indicates “fail”. The EBCS AP may, in some embodiments, include EBCS Neighbor AP information in the response frame, such information may be contained in a Neighbor Report element, a Reduced Neighbor Report element, an EBCS Neighbor AP element, which may identify an EBCS Neighbor AP that provides the same EBCS traffic streams or content as requested by the EBCS STA. The EBCS non-AP STA can use the information received about EBCS Neighbor APs to register for one or more EBCS traffic streams or content being transmitted or provided by one or more indicated EBCS Neighbor APs. To do so, a non-AP STA can use a frame containing an EBCS Traffic Stream or Content Request ANQP-element, or the EBCS non-AP STA uses the information received on EBCS Neighbor APs to request one or more EBCS traffic streams or content from one or more indicated EBCS Neighbor APs using an EBCS Traffic Stream or content request frame.

To terminate one or more EBCS traffic streams or content, an EBCS AP may transmit one or more Termination Notice frames indicating that the AP is terminating the transmission of the EBCS traffic stream or content. In some embodiments, the EBCS AP includes EBCS Neighbor AP information in the Termination Notice frame. For example, in a case where the EBCS AP will not extend the transmission of the EBCS traffic streams or content (regardless of any EBCS non-AP STA requests for the extension of the EBCS traffic streams), the EBCS AP sets a negotiation method field to “no negotiation”. The EBCS Neighbor AP information may be inserted in a Neighbor Report element, a Reduced Neighbor Report element, or an EBCS Neighbor AP element, which may be contained in the EBCS Termination Notice, indicating that the EBCS Neighbor AP provides the same EBCS traffic streams or content that the transmitting EBCS AP will terminate. The EBCS non-AP STA then uses information received regarding EBCS Neighbor APs to register for one or more EBCS traffic streams or content. The registration may be achieved using a frame containing an EBCS Traffic Stream or Content Request ANQP-element. Alternatively, the EBCS non-AP STA can use the information received on EBCS Neighbor APs to request one or more EBCS traffic streams or content from one or more indicated EBCS Neighbor APs. The requested EBCS traffic stream or content may be the same or similar to the EBCS traffic stream or content that the STA is presently consuming.

Example techniques for efficient discovery of enhanced broadcasting services (EBCS) are described in the following embodiments. In one embodiment, a fast initial link setup (FILS) Discovery frame may be used for discovery of EBCS services and EBCS traffic streams. For example, referring to FIG. 2C, a signal flow diagram 2500 shows a first EBCS AP 2510 transmitting an EBCS traffic stream 2540 to at least one EBCS STA 2520 that receives the EBCS traffic stream 2542. In embodiment, the second EBCS AP 2530 transmits a FILS Discovery frame 2544 including an indication that the second EBCS AP 2530 is an EBCS AP and/or an indication that the AP provides EBCS broadcasting services. For example, the FILS Discovery frame transmitted by an EBCS AP may contain one or more EBCS related fields, such as, but not limited to: an EBCS capability indication, an EBCS Info frame transmission field, and/or an EBCS Info frame transmission (Tx) Countdown field, which will be described in more detail below.

In some embodiments, the EBCS Info frame transmission field and/or the EBCS Info frame TX Countdown field contained in the FILS Discovery frame 2544 may be one or two bytes in length. The value indicated in the EBCS Info frame transmission field and/or EBCS Info frame TX Countdown field may be in terms of any one of more of the following units: number of target beacon transmission times (TBTTs), number of beacon intervals, number of time units (e.g., TUs), and/or a duration of time (e.g., in terms of microseconds, milliseconds, or other time units). The EBCS Info frame transmission field and/or the EBCS Info frame TX Countdown field indicates, to the EBCS STA 2520, information regarding a subsequent transmission of an EBCS Info frame by the second EBCS AP 2530, thereby assisting the EBS STA 2520 to receive the subsequent EBCS Info frame.

In some embodiments, the FILS Discovery frame 2544 may include an EBCS Info frame transmission field present bit or an EBCS Info Frame Tx Countdown present bit. An EBCS Info frame transmission field present bit, or EBCS Info Frame Tx Countdown present bit, set to encode a value of 1 indicates that the current FILS Discovery frame carrying the bit may contains an EBCS Info Frame Transmission field, and/or an EBCS Info frame Tx Countdown field, respectively. Alternatively, a value encoding 0 may also indicate the same information.

In some embodiments, the FILS Discovery frame 2544 transmitted by an EBCS AP 2530 contains an EBCS Parameters element. Table 1 shows a FILS Discovery frame format including an EBCS Parameters element.

TABLE 1

FILS Discovery frame format including an EBCS Parameters element

| Order | Information | Notes |
|---|---|---|
| 1 | Category | |
| 2 | Public Action | |
| 3 | FILS Discovery Information field | |
| 4 | Reduced Neighbor Report element | One or more Reduced Neighbor Report elements may be present if dot11FILSActivated or dot11ColocatedRNRImplemented is true; otherwise, they are not present.(11ax) |

TABLE 1-continued

FILS Discovery frame format including an EBCS Parameters element

| Order | Information | Notes |
|---|---|---|
| 5 | FILS Indication element | The FILS Indication element may be present if dot11FILSActivated is true; otherwise, it is not present.(11ax) |
| 6 | Roaming Consortium element | The Roaming Consortium element may be present if dot11FILSActivated is true; otherwise, it is not present.(11ax) |
| 7 | TIM element | The TIM element may be present if dot11HEOptionImplemented is true; otherwise, it is not present. |
| 8 | TWT element | The TWT element may be present if dot11HEOptionImplemented is true, otherwise, it is not present. If present, the Broadcast field of the TWT element is 1. |
| 9 | OPS element | The OPS element may be present if dot11HEOptionImplemented is true; otherwise, it is not present. |
| 10 | Transmit Power Envelope element | One Transmit Power Envelope element may be present for each distinct combination of values of the Maximum Transmit Power Interpretation subfield and Maximum Transmit Power Category subfield that is supported for the BSS if both of the following conditions are met: Either dot11VHTOptionImplemented or dot11ExtendedSpectrumManagementImplemented is true. Either dot11SpectrumManagementRequired or dot11RadioMeasurementActivated is true. (e.g., in a 6 GHz HE AP, both dot11VHTOptionImplemented and dot11SpectrumManagementRequired may be true). |
| 11 | EBCS Parameters element | The EBCS Parameters element may be present if the transmitting AP has enabled EBCS. An EBCS Info frame TX Countdown field may be present if the transmitting STA or AP has dot11EBCSSupportActivated equal to true. In some embodiments, the EBCS Info frame TX Countdown field may be present if the transmitting STA or AP has dot11EBCSSupportActivated equal to true and the length of its dot11EBCSContentList is larger than 0, it is otherwise not present. |

The EBCS Parameters element may contain an EBCS Info Frame TX Countdown field, which may indicate the time remaining until the next transmission of an EBCS Info frame by the AP. The value indicated in EBCS Info Frame TX Countdown field may be in terms of any one or more of the following units: number of TBTTs, number of beacon intervals, number of time units (e.g., TUs), and/or a duration of time (e.g., in terms of microseconds, milliseconds, or other time units), as described above.

Figure 2C:
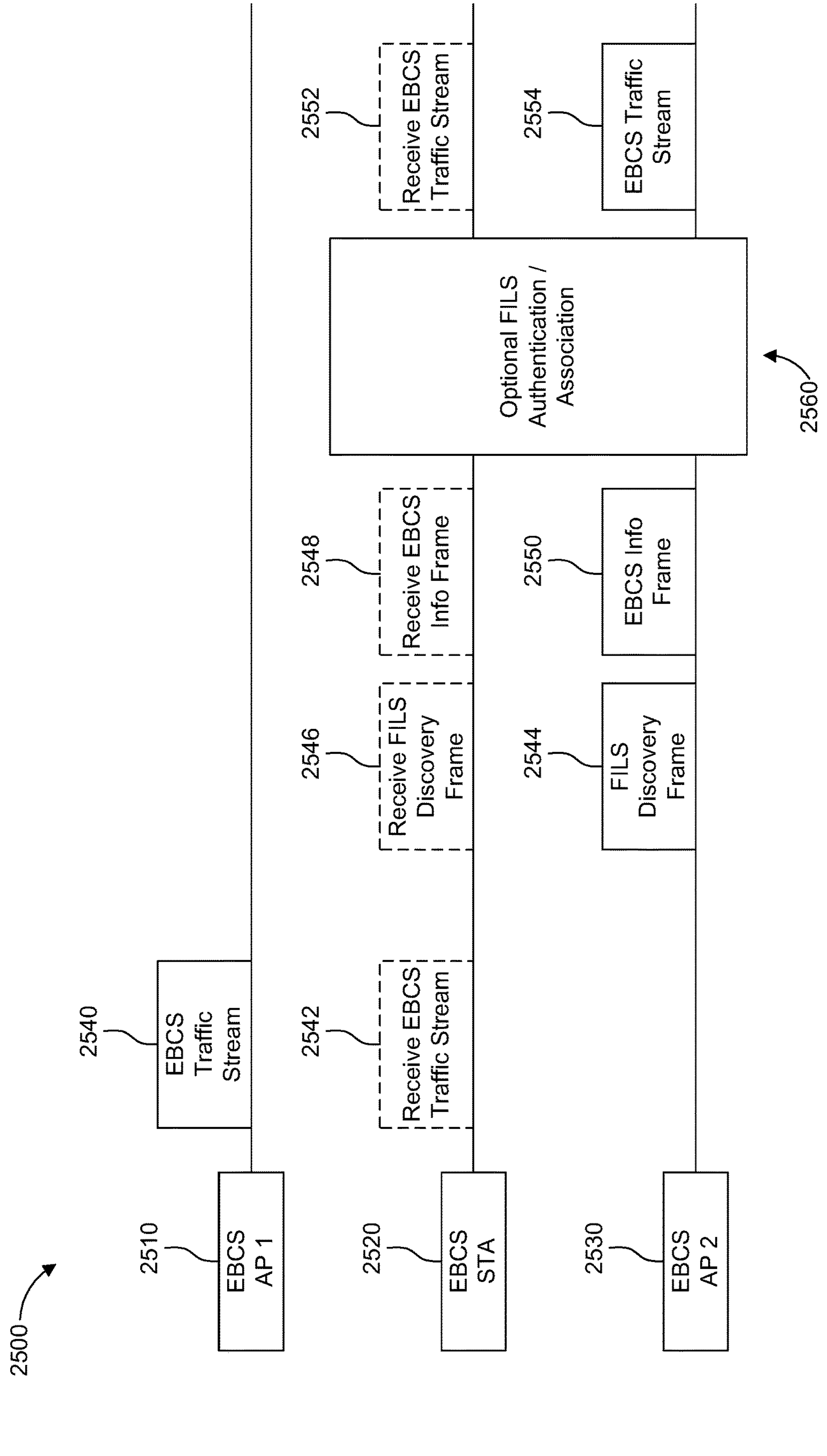
FIG. 2C is a signal flow diagram of a procedure using FILS Discovery frames to convey EBCS information.

Still referring to FIG. 2C, an EBCS AP that has EBCS enabled, such as the second EBCS AP 2530, that transmits a FILS Discovery frame 2544, may include an EBCS Parameters element in the FILS Discovery frame 2544 that it transmits. In embodiments where an AP is not in a multiple BSSID set and has enabled EBCS, the AP may include an EBCS Parameters element in the FILS Discovery frame that it transmits. In embodiments where an AP in a multiple BSSID set corresponding to the transmitted BSSID and has enabled EBCS may include an EBCS Parameters element in the FILS Discovery frame that it transmits.

In other embodiments, an AP or STA that transmits a FILS Discovery frame and has dot11EBCSSupportActivated equal to true may include an EBCS Parameter element in the FILS Discovery frame that it transmits. In other embodiments, an AP that is not in a multiple BSSID set and has dot11EBCSSupportActivated equal to true may include an EBCS Parameters element in the FILS Discovery frame that it transmits. In a multiple BSSID set, the AP corresponding to the transmitted BSSID and has dot11EBCSSupportActivated equal to true may include an EBCS Parameters element in the FILS Discovery frame that it transmits. In either case, the transmitted FILS Discovery frame that is transmitted includes the EBCS Info Frame TX Countdown field in the EBCS Parameters element.

In another embodiment, an AP or STA that transmits a FILS Discovery frame and has dot11EBCSSupportActivated equal to true and the length of its dot11EBCSContentList larger than 0 may include an EBCS Parameter element in the FILS Discovery frame that it transmits. In an embodiment, an AP that is not in a multiple BSSID set and has dot11EBCSSupportActivated equal to true and the length of its dot11EBCSContentList larger than 0 may include an EBCS Parameters element in the FILS Discovery frame that it transmits. In a multiple BSSID set, the AP corresponding to the transmitted BSSID and has dot11EBCSSupportActivated equal to true and the length of its dot11EBCSContentList larger than 0 may include an EBCS Parameters element in the FILS Discovery frame that it transmits. In either case, the transmitted FILS Discovery frame that is transmitted includes the EBCS Info Frame TX Countdown field in the EBCS Parameters element.

Still referring to FIG. 2C, once the EBCS STA 2520 receives the FILS Discovery frame 2544 from the second EBCS AP 2530, using the information contained in the FILS Discovery frame 2544, and particularly using the information contained in the EBCS Parameters element carried therein, such as EBCS Info Frame TX Countdown field, the EBCS STA 2520 may receive an EBCS Info frame 2548 that is transmitted 2550 by the second EBCS AP 2530. Using the information contained in the EBCS Info frame 2550, the EBCS STA 2520 may then receive a desired EBCS traffic stream 2552 that is transmitted 2554 by the second EBCS AP 2530. In this embodiment, the EBCS traffic stream 2554 transmitted by the second EBCS AP 2530 does not require the EBCS STA 2520 to be associated in order to receive the transmitted EBCS traffic stream 2554.

In some embodiments, though, the EBCS STA 2520 must associate with the second EBCS AP 2530 to receive the EBCS traffic stream 2554. In this scenario, the EBCS STA 2520 may request the EBCS data stream using methods described above. In order to facilitate this, an EBCS AP that provides one or more EBCS traffic streams requiring association may include robust security network (RSN) information in the FILS Discovery (FD) RSN Information subfield in the FILS Discovery Information field of the FILS Discovery frame. Accordingly, if a received FILS Discovery frame contains an EBCS Parameter element, then the EBCS STA 2520 that received the FILS Discovery frame that contains an EBCS Parameter element may determine the beacon interval during which the next EBCS Info frame 2550 is expected to be transmitted by the second EBCS AP 2530.

The EBCS STA 2520 that receives a FILS Discovery frame 2544 containing an EBCS Parameters element that includes RSN information in the FILS Discovery RSN Information subfield may use the RSN information to conduct FILS authentication/association 2560 with the second EBCS AP 2530 (e.g., using a FILS authentication protocol). The EBCS STA 2520 will do this if it has determined that the second EBCS AP 2530 provides one or more desired EBCS traffic streams that require association. The EBCS STA 2520 may determine that an AP provides one or more desired EBCS traffic streams that require association based on parameters such as SSID, short SSID, or through other means.

In other related embodiments of, a method of enhancing a broadcast service by performing a channel sensing method will now be described. APs typically broadcast beacon signals conveying information to STAs operating within their broadcast ranges. Wireless networks can comprise a large number, e.g., thousands, of non-AP STAs. Non-AP STAs can include a wide variety of sensors operating in an Internet of Things (IoT) environment in which the sensors wirelessly transmit their sensed data to an AP within their transmission ranges. Many of these sensors are suitable for sensing environmental phenomena useful for characterizing a channel in which the non-AP STA and the AP operate. Embodiments of systems, apparatus and methods disclosed and described herein provide an enhanced channel sounding beacon service that provides channel information based on data provided by one or more of these sensor devices to thereby improve the ability of a STA to broadcast accurate reports of channel conditions in its operating area.

In some embodiments, a method includes establishing at least one service period (SP) during which at least one channel sounding procedure is performed. For example, in some embodiments a method includes establishing a first SP and performing one or more channel sounding set up actions within the first SP, then establishing a second SP and carrying out at least one channel measurement action within the second SP, then establishing a third SP and carrying out at least one channel measurement reporting action within the third SP, then establishing a fourth SP and carrying out at least one channel sounding termination action within the fourth SP.

In some embodiments, a measurement action comprises acquiring channel state information (CSI) associated with the channel. For example, a sensing initiator performs one or more actions to collect CSI, or to collect changes in CSI in a particular sensing environment. These actions may include the initiator transmitting one or more trigger frames to a non-AP sensor STA to solicit uplink data from the non-AP sensor STA.

Figure 3:
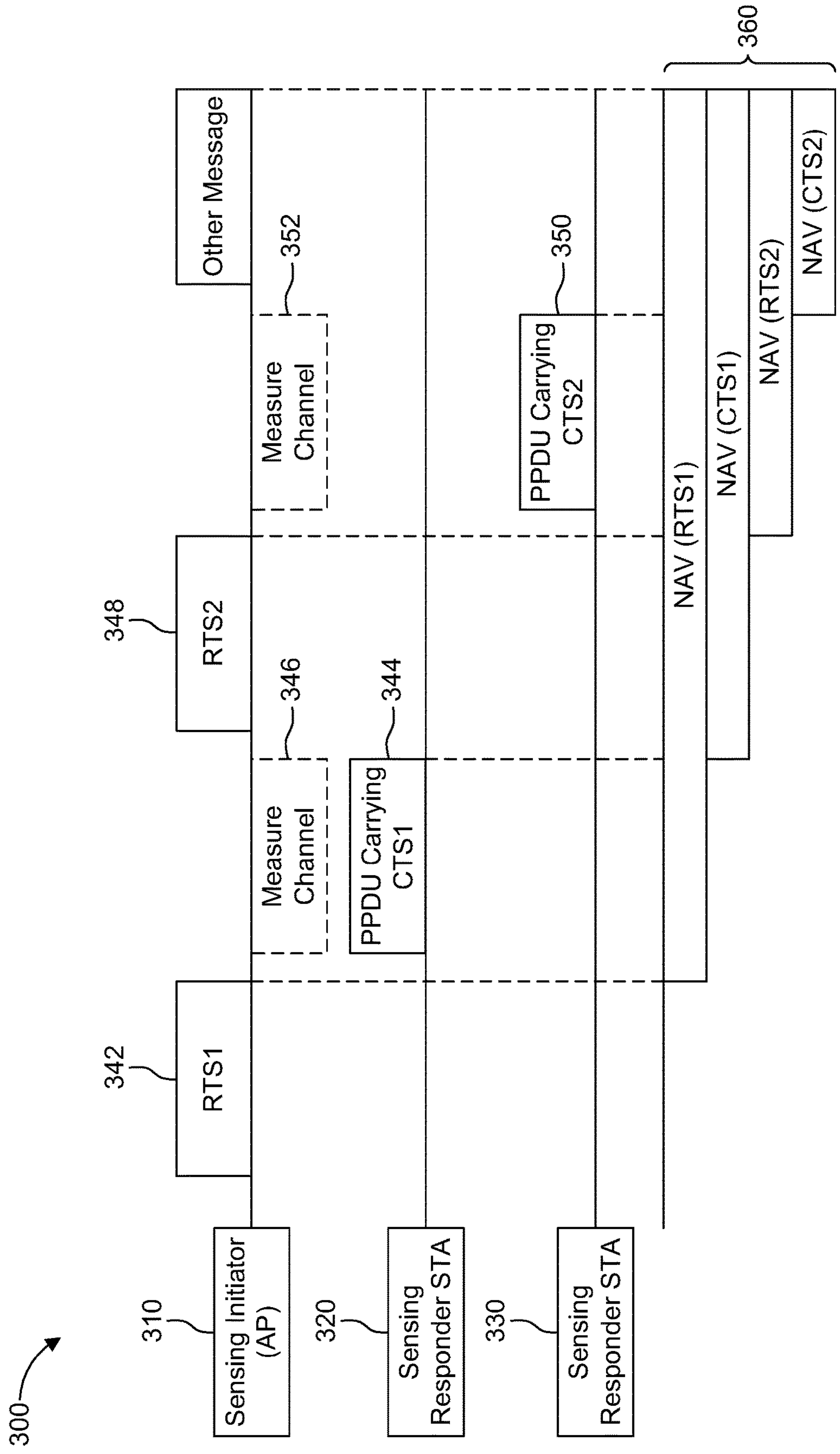
FIG. 3 is a signal flow diagram of cooperative interactions taken by a sensing initiator STA and a sensing responder station STA to measure a channel

FIG. 3 illustrates a signal flow of a sensing procedure 300 according to one embodiment. In the procedure, a sensing initiator AP 310 is in wireless communication with a first sensing responder STA 320 and a second sensing responder STA 330. the sensing initiator AP 310 transmits a request to transmit (RTS1) 342 to the first sensing responder STA 320. The first sensing responder STA 320 transmits a physical protocol data unit (PPDU) carrying a clear to send (CTS) 344 signal in response to the RTS 342. The sensing initiator AP 310 performs a channel measurement 346 while the sensing responder STA 320 transmits the PDDU carrying the CTS 344. In some embodiments, the PPDU carrying the CTS 344 includes a training field that is used by the sensing initiator AP 310 to measure the CSI. In some embodiments, the training field is used to measure the CSI at another receiver in the vicinity of the sensing initiator AP 310. This procedure may then be repeated for the second sensing responder STA 330, with another RTS 348, and another PPDU carrying a CTS 350, where the sensing initiator AP 310 may measure the channel 352.

Thus, embodiments use RTS/CTS frames in a novel way to measure a channel, instead of for use in preparing to transmit data. Therefore, the length of the RTS that the sensing initiator AP transmits may be set to a very small value. In some embodiments, a first RTS may be of sufficient length to cover the time for just one RTS/CTS transmission, or for multiple RTS/CTS transmissions, during which one or more additional STAs perform an action of setting a NAV such that interference is avoided during the measurement time. This is illustrated in FIG. 3 by the NAV timer 360. The NAV timer 360, residing in each of the sensing responder STAs, is updated upon receipt of each received message. In some embodiments, CTSs and RTSs are subsequently transmitted so as to set the length of all remaining RTS/CTS transmissions based on the time remaining in the countdown from the initial setting such that the NAV setting from other devices can be set accordingly. Note the “Other message” block shown in FIG. 3 may be used for signalling additional actions such as terminating sensing.

Figure 4:
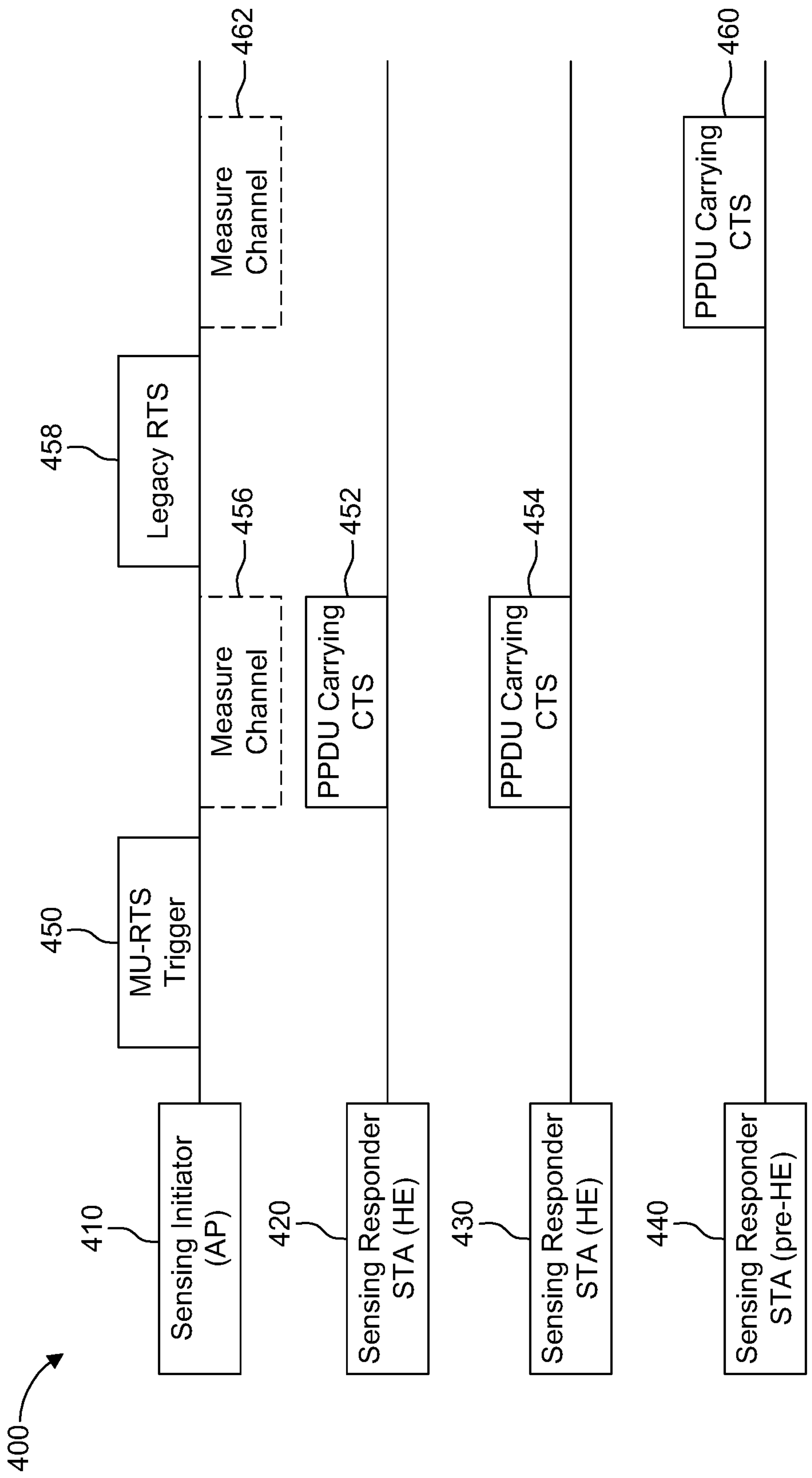
FIG. 4 is a signal flow diagram of cooperative interactions taken by a sensing initiator AP and sensing responder STAs to measure a channel in a multi user (MU) scenario.

For some embodiments in which a responding STA is an 802.11bf compliant sensing device, a flag is used, such as a 1-bit indicator provided in the service field of the data field of the RTS. This bit indicates that this RTS is sent as part of a sensing procedure. Thus, the responding STAs will not expect to subsequently receive data from the RTS transmitter, in this case, the sensing initiator. In some embodiments, the sensing initiator and sensing responder are high efficiency (HE) or Extreme High Throughput (EHT) capable devices. In such embodiments, the channel measurement actions may be carried out using an MU-RTS/CTS mechanism, where multi-user (MU) transmissions are utilized. FIG. 4 illustrates an embodiment of this method.

Referring to FIG. 4, a signal flow 400 according to one embodiment includes a sensing initiator AP 410 that is HE or EHT capable, and thus MU capable, a first sensing responder STA 420 and a second sensing responder STA 430 that are both HE and MU capable, and a legacy third sensing responder STA 440 that is not HE or MU capable. It is noted that the MU capable devices are described herein as HE or EHT capable devices, but that is not meant to be limiting. Any device that is compliant with future standards that is MU capable is encompassed by the embodiments described herein. The sensing initiator AP 410 sends a MU-RTS trigger 450 to the first sensing responder STA 420 and the second sensing responder STA 430 soliciting the HE STAs to send CTSs in a MU coordinated transmission on resources indicated in the MU-RTS trigger 450. The first sensing responder STA 420 transmits a first PPDU carrying CTS 452 in MU resources indicated by the MU-RTS trigger 450 along with the second sensing responder STA that transmits a second PPDUY carrying CTS 454. The training fields in the PPDUs that carry the first and second CTSs (452 and 454) are then used by the sensing initiator AP 410 to perform channel measurement 456. In some embodiments, such as shown in FIG. 4, both HE STAs and legacy STAs exist in a WLAN. Accordingly, in order to measure a channel associated with the legacy STA, the sensing initiator AP 410 uses a legacy RTS transmission 462 to solicit a PPDU carrying CTS 460 from the third, legacy sensing responder STA 440. In one embodiment, the legacy RTS transmission 462 and the PPDU carrying CTS 260 from the third, legacy sensing responder STA 440 occur in the same transmission opportunity as the other transmissions described. The method of setting the NAV or length information in the soliciting MU-RTS Trigger frame and in RTS frame, the NAV timer at each STA, and use of the "other message" illustrated and described above with reference to FIG. 3 may also be applied here to the method illustrated in FIG. 4.

Figure 5:
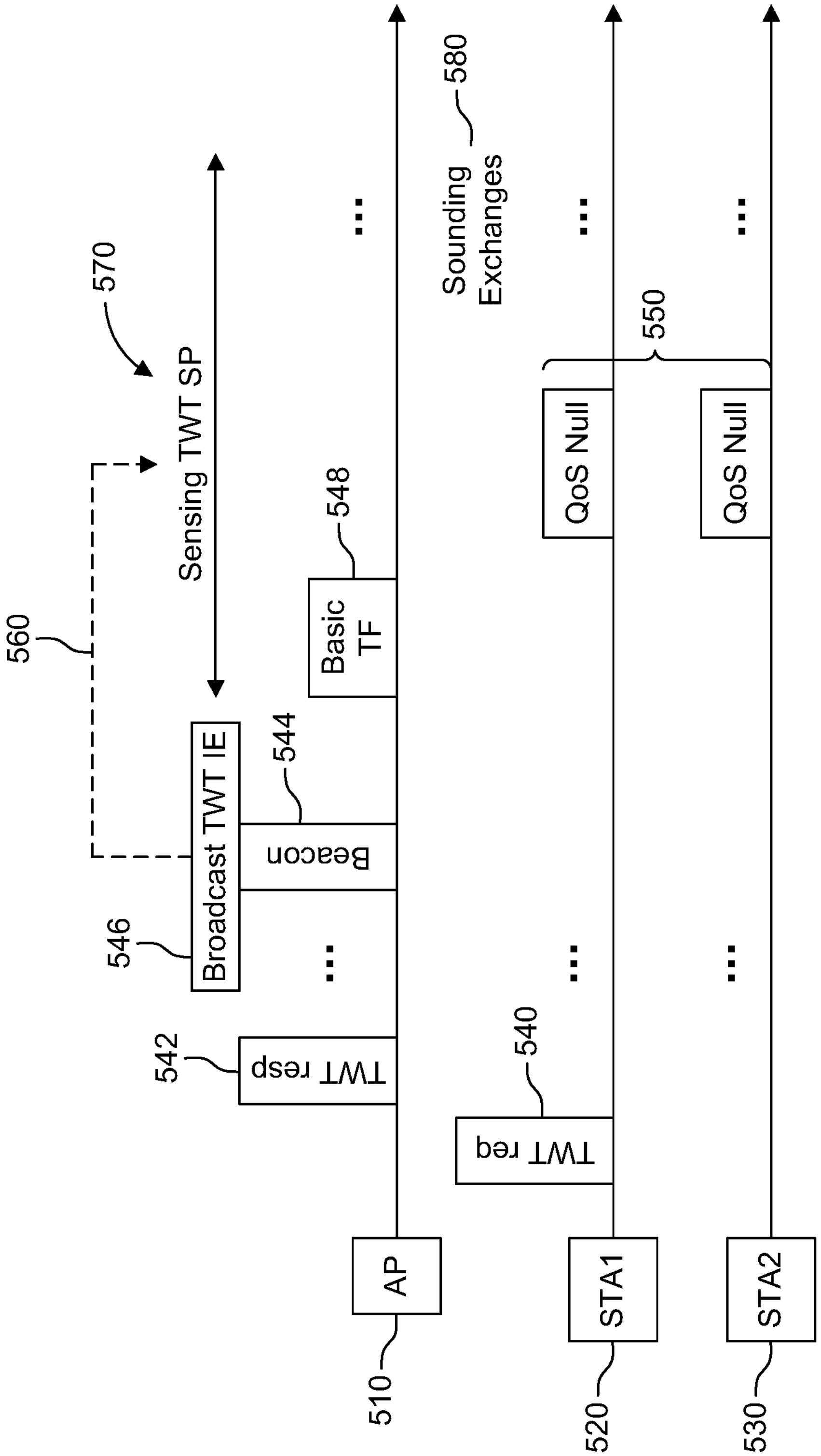
FIG. 5 is a signal flow diagram of channel sensing

In a further embodiment, a target wake time (TWT) sensing method will now be described. Referring to FIG. 5, an AP 510 has two associated STAs, STA1 520 and STA2 530, and the AP 510 establishes a channel sensing session using TWT procedures. First, the AP 510 announces its capabilities to perform TWT based sensing within a TWT service period (SP) (not shown in the figure). The announcement is made using any one of: a Beacon frame, a Probe Response frame, a (Re)Association Response frame, or other suitable type of management frame or control frame. Likewise, a non-AP STA or a sensing responder STA announces its capabilities to perform TWT based sensing within an SP using one of: a Probe Request frame, a (Re)Association Request frame or other type of management frame or control frames (also not shown in the figure).

As shown in FIG. 5, a non-AP STA 520 may negotiate with an AP 510 and acquires a TWT membership by sending a TWT request frame 540 to the AP 510, and receiving from the AP 510 a TWT response frame 542. The non-AP STA 510, now in TWT operation, enters an awake state prior to the transmission of a beacon frame 544 carrying a Broadcast TWT IE 546. The STA 520 determines a Broadcast sensing TWT SP 570 based on the information in the Broadcast TWT IE 546. The AP indicates in TWT IE 550, a broadcast TWT start time, a TWT wake duration, an interval between broadcast TWT service periods and support for trigger based TWT procedure.

The Broadcast TWT IE 546 may also include setup information for the scheduled sensing procedure. For example, in some embodiments the information includes identification of the sensing initiator(s) and sensing responder(s), an indication of sensing measurement type, e.g., CQI, CSI, SINR, Path loss, time of Arrival (TOA), angle of arrival (AOA), angle of departure (AOD). The Broadcast TWT IE 546 can further indicate parameters of the sensing procedure to be conducted in the broadcast sensing TWT service period, e.g., multi-antenna setting, channel bandwidth setting, sensing measurement resolution, etc. The IE can further indicate a periodicity of the broadcast sensing TWT service period as well as a TWT sensing channel, which may or may not comprise the primary channel(s).

Next, the AP 510 transmits a trigger frame 548, which may be a basic trigger frame, to STAs that are awake in their respective TWT. STAs scheduled for a TWT (STA 1 520 and STA 2 530) respond with an indication of their awake status and readiness to participate in sensing procedures. For example, STA1 520 and STA2 530 each transmit a QoS null frame 550 (or a PS-Poll frame or an NDP packet). In some embodiments, the AP and STAs exchange frames, e.g., an NDPA frame, an NDP frame, an NDP trigger frame, a BFRP trigger frame, a BF report frame or any other frame suitable for a particular sensing procedure during the sounding exchanges 580 phase of the sensing TWT SP 570. A sensing broadcast TWT ID may be used in some embodiments to uniquely identify a sensing TWT SP. A STA may go back to doze state after the scheduled TWT.

In some embodiments, an AP advertises TWT SP parameters and AP updated information in Beacon frames. A non-AP STA transmits a TWT response frame to negotiate the TWT SP parameters. In some embodiments, the AP terminates a periodically occurring sensing TWT SP by transmitting a broadcast TWT IE that indicates the termination of the sensing TWT.

Figure 6:
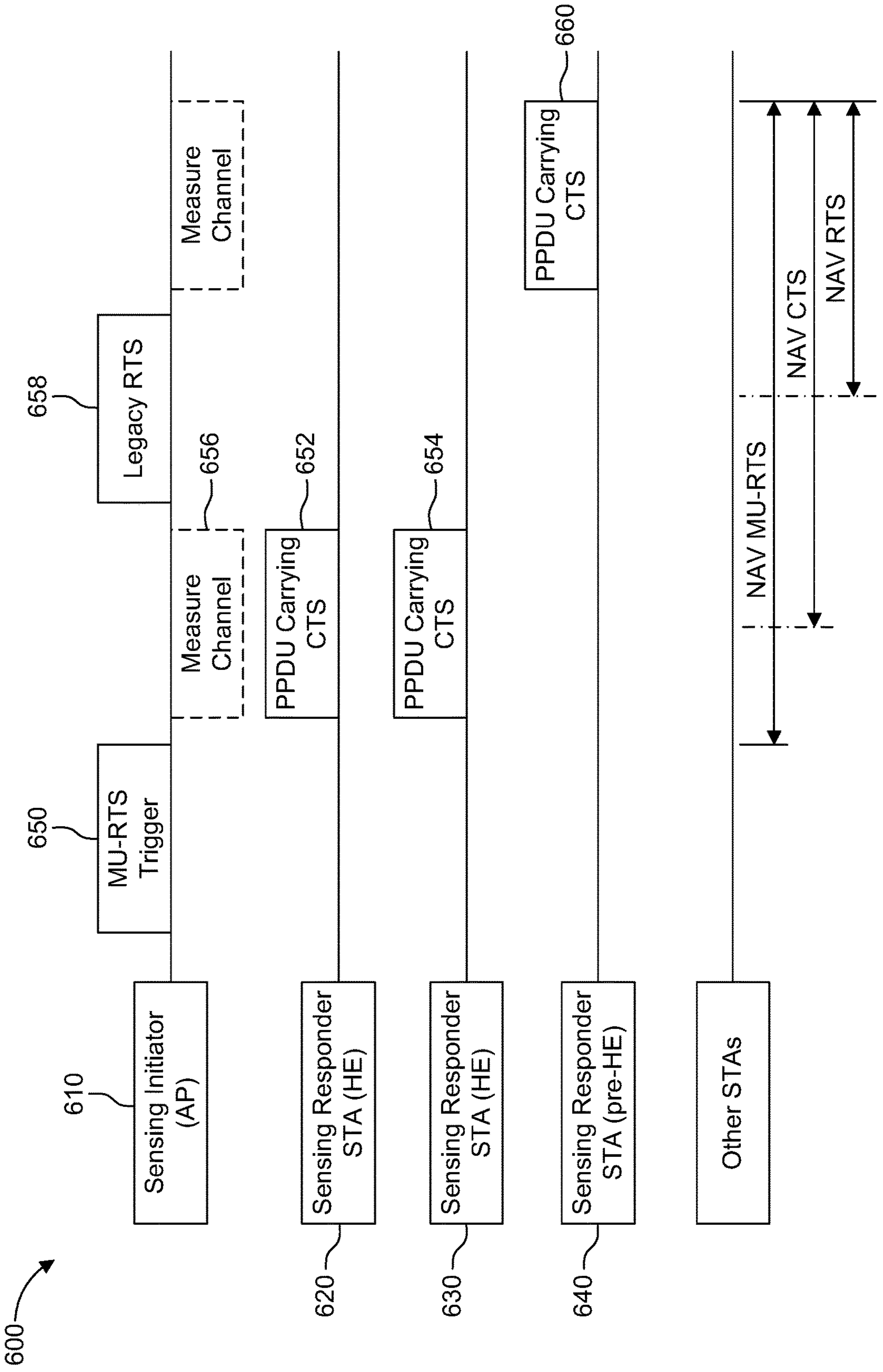
FIG. 6 is a signal flow diagram of an example sensing measurement procedure using MU-RTS/CTS and RTS/CTS exchanges.

In another embodiment, referring to FIG. 6, a signal flow 600, similar to the procedure described above with reference to FIG. 4, includes a sensing initiator AP 610 transmitting an MU-RTS (trigger) frame 650 to solicit STAs that are capable of transmitting Trigger Based (TB) PPDUs (i.e. a first MU capable sensing STA responder STA 620, a second MU capable sensing responder STA 630, and a legacy sensing responder STA 640). The first MU capable sensing responder STA 620 and the second MU capable sensing responder STA 630 each transmit respective PPDUs carrying CTS 652, 654. The sensing initiator AP uses the received PDDU carrying CTS 652, 654 to measure each channel (i.e. a first channel between the sensing initiator AP 610 and the first MU capable sensing responder STA 620, and a second channel between the sensing initiator AP 610 and the second MU capable sensing responder STA 630, or combined channel between the sensing initiator AP 610 and the MU capable sensing responders STA 620 and 630). The sensing initiator AP 610 may subsequently transmit one or more legacy RTS frames 658 to solicit a PPDU carrying a CTS frame 660 from at least one non-MU capable sensing responder STA 640. The sensing initiator AP 610 may perform channel measurements using the PPDU carrying a CTS frame 660 transmitted by the at least one non-MU capable (i.e. legacy) sensing responder STA 640. In some embodiments, the sensing initiator AP 610 may send an MU-RTS trigger frame 650 with the duration field in the medium access control (MAC) header set to (N*2+1)*aSIFSTime+(N+1)*aCTSTime+N*aRTSTime, wherein aSIFSTime is the time duration of Short Interframe Space (SIFS), aCTSTime is the time to transmit a CTS frame, aRTSTIME is the time to transmit a RTS frame, and N is the number of legacy RTS/CTS exchanges following the current MU-RTS/CTS exchange. The MU-RTS trigger frame 650 may be used to solicit one or more CTS frames from STAs (e.g., HE STAs, EHT STAs, and/or future generations STAs) that can interpret the MU-RTS frames (i.e. 620, 630 for example). The STAs 620,630 may respond by transmitting a CTS frame 652, 654 on resources as allocated by the MU-RTS trigger frame 650 and the STAs 620, 630 may set the duration field of the CTS frame 652, 654 to N*2*aSIFSTime+N*aCTSTime+N*aRTSTime.

Figure 7:
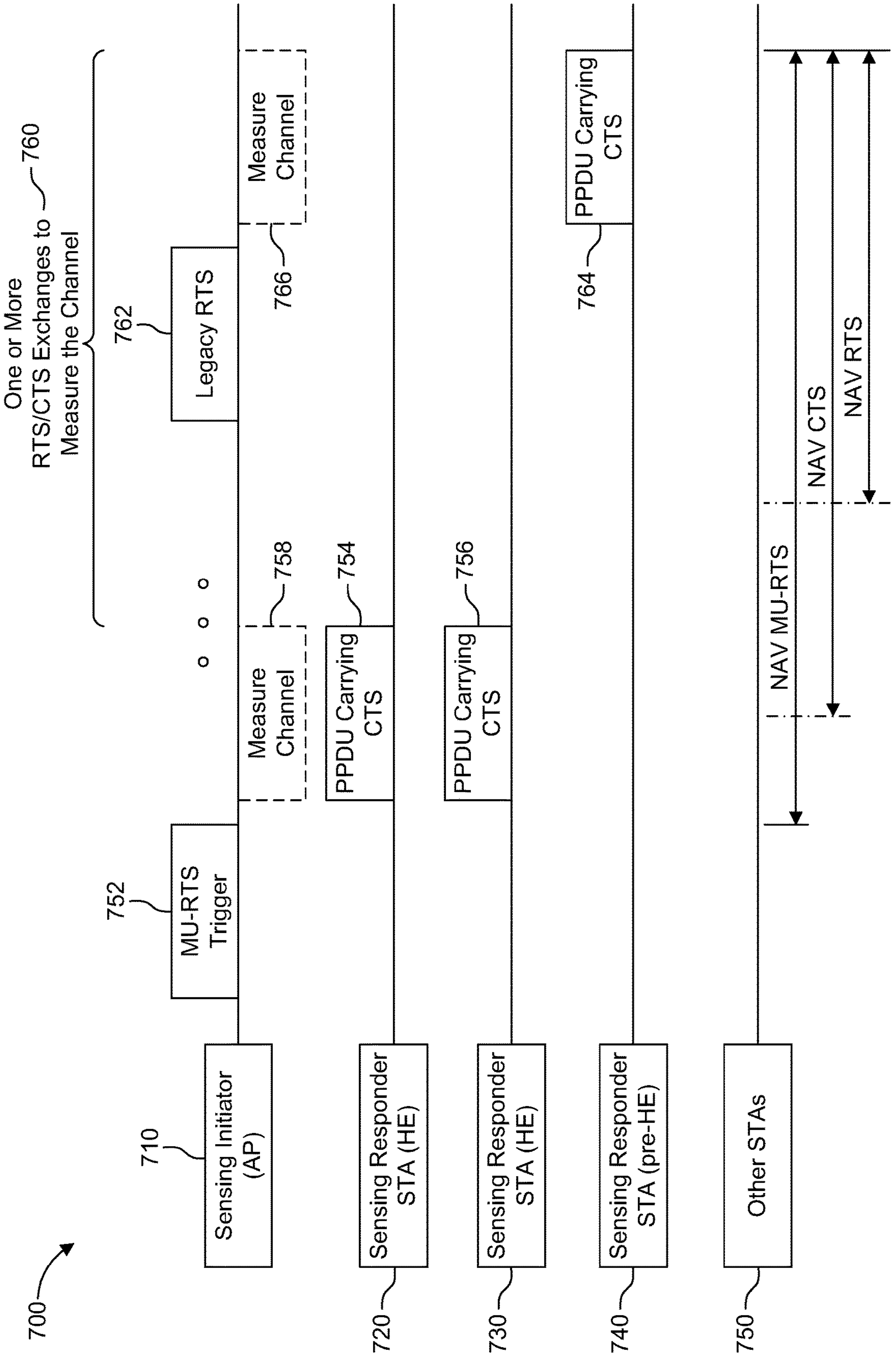
FIG. 7 is a signal flow diagram of an example sensing measurement procedure using MU-RTS/CTS and RTS/CTS exchanges.

In another embodiment, referring to FIG. 7, a signal flow 700, similar to the example described above with reference to FIG. 6, includes a PPDU carrying CTS 754, 756 transmission by a first MU capable sensing responder STA 720 and a second MU capable sensing responder STA 730, triggered by a sensing initiator AP 710 transmitting a MU-RTS trigger 752. The MU-RTS trigger 752 and CTS 754, 756 exchange may be followed by one or more legacy RTS/CTS exchanges 760 within the same TXOP and/or in a different TXOP. The one or more legacy RTS/CTS exchanges 760 may be initiated by the sensing initiator AP 710 to solicit a PPDU carrying a CTS frame 764 transmitted by a legacy STA 740, that may or may not able to understand MU-RTS frames. The sensing initiator AP 710 may measure the channel 766 when the CTS frames 764 are transmitted by the sensing responder STAs 740. For each RTS frame 762, the duration field in the MAC header may be set to (M*2+1)*aSIFSTime+(M+1)*aCTSTime+(M−1)*aRTSTime if there are M RTS/CTS exchanges following the current RTS/CTS exchange.

In the embodiments described with reference to FIG. 6 and FIG. 7, based on the duration information contained in an MU-RTS frame, a (legacy) RTS frame, and/or a (legacy) CTS frame, other STAs listening on the medium and reading the duration information from those frames may set and/or update their NAV timer so they can defer from accessing the medium for the indicated duration and save power.

In another embodiment, the MU-RTS/CTS exchanges may be followed by one or more MU-RTS/CTS exchanges, which may be followed by one or more RTS/CTS exchanges within the same TXOP and/or in a different TXOP.

In the example procedures described above, the sensing initiator (e.g., AP) may also initiate one or more legacy RTS/CTS exchanges first before transmitting one or more MU-RTS frames to solicit CTS frames from multiple STAs that may be capable of interpreting MU-RTS frames.

In other embodiments, with reference to any of the procedures described hereinbefore, MU-RTS/CTS exchanges may be replaced by buffer status report poll (BSRP)/buffer status report (BSR) exchanges so that the sensing initiator AP may measure the channel over non-overlapping subchannels in the channel when BSR frames are transmitted by sensing responder STAs. In this embodiment, the duration field settings in the BSRP frames may be calculated by (N*2+1)*aSIFSTime+N*aCTSTime+N*aRTSTime+aBSRTime, wherein aBSRTime is the time to transmit an BSR frame, and N is the number of legacy RTS/CTS exchanges following the current BSRP/BSR exchange. The BSRP frame may be used to solicit one or more BSR frames from STAs (e.g., HE STAs, EHT STAs, and/or future generations STAs) that can interpret the BSRP frames. The HE/EHT/future generation STAs may respond to the BSRP frame by transmitting a BSR frame on resources as allocated by the BSRP frame and set the duration field of the CTS frame to N*2*aSIFSTime+N*aCTSTime+N*aRTSTime.

The BSRP/BSR exchanges may be followed by N (N>=0) RTS/CTS exchanges within the same TXOP and/or in a different TXOP. The RTS/CTS exchanges may be initiated by the sensing initiator to solicit CTS frames transmitted by STAs that may or may not able to understand MU-RTS frames. The sensing initiator AP may measure the channel when the CTS frames are transmitted by the sensing responder STAs. For each RTS frame, the duration field in the MAC header may be set to (M*2+1)*aSIFSTime+(M+1)*aCTSTime+(M−1)*aRTSTime if there are M RTS/CTS exchanges following the current RTS/CTS exchange. In any the examples described herein, SIFS nay be used as an example, however other interframe spacings or time durations may be used in place of SIFs.

In another embodiment, the MU-RTS frame (or sensing trigger frame) described in the embodiments above may include a new class of User Info field or Sensing User Info field. For example, the Sensing User Info field may contain resource unit (RU) allocations for a sensing response STA that does not occupy the primary channel(s), which may be used by the sensing initiating AP to measure a particular RU or subchannel. A sensing MU-RTS or sensing trigger frame may include User Info fields that may be used to solicit CTS frames from legacy STAs on subchannels that occupy the primary channel(s), and may include User Info fields to solicit CTS or other sensing frames from STAs such as 802.11bf STAs (or future generation STAs) on subchannels that do not occupy the primary channel(s).

A legacy STA receiving a sensing MU-RTS frame or sensing trigger frame that includes new class of User Info Fields may respond with a (legacy) CTS frame on subchannels that occupy the primary channel, and a STA such as an 802.11bf STA receiving a sensing MU-RTS frame or sensing trigger frame that includes new class of User Info Fields may respond with a CTS frame or other type of sensing frames on subchannels that do not occupy the primary channel as indicated by the received sensing MU-RTS or sensing trigger frame.

In another embodiment, a new Sensing Report Poll frame may be an enhanced version of a trigger frame, such as a BFRP frame or NFRP frame. The Sensing Report Poll frame may contain a Threshold field, for example in the common info field or other part of the Sensing Report Poll frame. The Sensing Report Poll frame may allocate one or more Random Access RUs in its frame body (e.g., using one or more of the User Info fields). A sensing responder STA that has conducted channel measurement may respond to the Sensing Report Poll frame by transmitting channel measurement information and/or CSI on one or more of the allocated random access RUs if the measurement of the channel performed by the sensing responder STA has exceeded the value indicated in the Threshold field included in the received Sensing Report Poll frame.

Although the features and elements of the present invention are described in the preferred embodiments in particular combinations, each feature or element can be used alone without the other features and elements of the preferred embodiments or in various combinations with or without other features and elements of the present invention. Although the solutions described herein conform to one or more 802.11 specific protocols, it is understood that the solutions described herein are not limited to implementation in 802.11 networks and lend themselves to implementation in other wireless systems as well. Although SIFS is used to indicate various inter frame spacing in the examples of the designs and procedures, all other inter frame spacing such as RIFS, AIFS, DIFS or other agreed time interval could be applied in the same solutions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in either one or both of a non-transitory computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) comprising:

a receiver configured to receive a fast initial link setup (FILS) discovery frame, from an access point (AP) that the STA is not associated with, the FILS discovery frame including an enhanced broadcast services (EBCS) information frame transmission countdown field;

the receiver configured to receive an EBCS information frame from the AP that the STA is not associated with based on the received EBCS information frame transmission countdown field.

2. The STA of claim 1, wherein the EBCS information frame transmission countdown field indicates a number of target beacon transmission time (TBTT) until a transmission of a next EBCS information frame by the AP that the STA is not associated with.

3. The STA of claim 1, wherein the EBCS information frame transmission countdown field is two bytes in length.

4. The STA of claim 1, wherein the EBCS information frame transmission countdown field is included in an EBCS parameters element.

5. The STA of claim 1, wherein the received EBCS information frame includes information on available EBCS traffic streams.

6. The STA of claim 1, further comprising:

a processor configured to select an available EBCS traffic stream based on the received EBCS information frame;

wherein the receiver is configured to receive the selected EBCS traffic stream based on the received EBCS information frame.

7. The STA of claim 1, wherein the FILS discovery frame includes robust secure network (RSN) information when the AP that the STA is not associated with is transmitting an EBCS traffic stream that requires association.

8. The STA of claim 7, further comprising:

a processor and a transmitter, the processor configured to select an EBCS traffic stream that requires association; and a transmitter and the processor configured to perform FILS authentication with the AP that the STA is not associated with using the RSN information.

9. The STA of claim 8, wherein the receiver is configured to receive the selected EBCS traffic stream that requires association subsequent to the performance of FILS authentication.

10. A method for use in a station (STA), the method comprising:

receiving a fast initial link setup (FILS) discovery frame, from an access point (AP) that the STA is not associated with, the FILS discovery frame including an enhanced broadcast services (EBCS) information frame transmission countdown field; and receiving an EBCS information frame from the AP that the STA is not associated with based on the received EBCS information frame transmission countdown field.

11. The method of claim 10, wherein the EBCS information frame transmission countdown field indicates a number of target beacon transmission time (TBTT) until a transmission of a next EBCS information frame by the AP that the STA is not associated with.

12. The method of claim 10, wherein the EBCS information frame transmission countdown field is two bytes in length.

13. The method of claim 10, wherein the EBCS information frame transmission countdown field is included in an EBCS parameters element.

14. The method of claim 10, wherein the received EBCS information frame includes information on available EBCS traffic streams.

15. The method of claim 10, further comprising:

selecting an available EBCS traffic stream based on the received EBCS information frame; and receiving the selected EBCS traffic stream based on the received EBCS information frame.

16. The method of claim 10, wherein the FILS discovery frame includes robust secure network (RSN) information when the AP that the STA is not associated with is transmitting an EBCS traffic stream that requires association.

17. The method of claim 16, further comprising:

selecting an EBCS traffic stream that requires association; and performing FILS authentication with the AP that the STA is not associated with using the RSN information.

18. The method of claim 17, further comprising:

receiving the selected EBCS traffic stream that requires association subsequent to the performance of FILS authentication.

* * * * *